United States Patent [19]

Benson et al.

[11] 4,297,942

[45] Nov. 3, 1981

[54] METHOD AND APPARATUS FOR FLAVORING AND SURFACE TREATMENT OF MEAT PRODUCTS

[75] Inventors: Clark K. Benson, Millbrae; Andrew A. Caridis, Foster City; Arthur A. Nilsen, San Francisco, all of Calif.

[73] Assignee: Heat and Control, Inc., San Francisco, Calif.

[21] Appl. No.: 653,192

[22] Filed: Jan. 28, 1976

Related U.S. Application Data

[63] Continuation of Ser. No. 489,131, Jul. 17, 1974, abandoned.

[51] Int. Cl.³ .............................................. A47J 37/00
[52] U.S. Cl. .................................... 99/386; 99/389; 99/443 C; 198/576
[58] Field of Search ................. 99/386, 388, 391, 383, 99/443 C, 483, 390, 427, 444, 389, 401; 126/41 C; 198/576

[56] References Cited

U.S. PATENT DOCUMENTS

| | | | |
|---|---|---|---|
| 1,173,917 | 2/1916 | Barter | 198/576 X |
| 1,458,021 | 6/1923 | Bamford | 99/443 C |
| 2,032,272 | 2/1936 | Feltman | 99/349 |
| 2,483,669 | 10/1949 | Reid | 99/388 X |
| 2,741,357 | 4/1956 | Surico | 198/576 X |
| 2,788,735 | 4/1957 | Farace | 99/443 C X |
| 2,807,550 | 9/1957 | Zarotschenzeff et al. | 99/443 C X |
| 3,065,079 | 11/1962 | Elliott | 99/349 |
| 3,256,803 | 6/1966 | Nelson | 99/386 X |
| 3,316,833 | 5/1967 | Williams et al. | 99/443 C X |
| 3,528,361 | 9/1970 | LeVan | 99/386 X |
| 3,580,164 | 5/1971 | Baker | 99/391 X |
| 3,581,652 | 6/1971 | Chauvin | 99/443 C X |
| 3,646,879 | 3/1972 | Palmason et al. | 99/386 X |
| 3,646,880 | 3/1972 | Norris | 99/349 |
| 3,693,452 | 9/1972 | McGinley et al. | 99/443 C X |
| 3,943,910 | 3/1976 | White | 99/427 X |
| 3,961,569 | 6/1976 | Kenyon et al. | 99/443 C X |

FOREIGN PATENT DOCUMENTS 537246  4/1955  Belgium .......................... 99/443 C

*Primary Examiner*—Harvey C. Hornsby
*Assistant Examiner*—Arthur O. Henderson
*Attorney, Agent, or Firm*—Flehr, Hohbach, Test, Albritton & Herbert

[57] ABSTRACT

A continuous process for imparting a charcoal-broiled flavor and appearance to meat products, moves the product into impingement with open gas flames to sear the product's surfaces and to brand the upper and lower product surfaces with hot, metal branding elements.

The food treatment apparatus has a housing furnished with product inlet and outlet conveyors. Movable branding apparatus disposed between the conveyors are heated by open flame gas burners. The conveyors and branding apparatus are driven in synchronization so that the product may move from the inlet conveyor to the branding station and thence to the outlet conveyor for further treatment.

5 Claims, 8 Drawing Figures

METHOD AND APPARATUS FOR FLAVORING AND SURFACE TREATMENT OF MEAT PRODUCTS

This is a continuation of application Ser. No. 489,131, filed July 17, 1974, now abandoned.

BACKGROUND OF THE INVENTION

This invention pertains to the surface treatment of food products and specifically to a continuous process and an apparatus for imparting a charcoal-broiled flavor and appearance to meat products and for searing the surfaces of such products.

In the food preparation industry meat products were prepared with a characteristic charcoal-broiled flavor by either cooking the products upon a very hot metal grille, or in the presence of charcoal or by applying an artificial flavor material to the products. Further, it is very desirable that products, such as steaks, chopped beef, hamburger patties, and the like have the visual appearance of having been broiled, as the public has come to associate the parallel branding marks on a meat product with the characteristic charcoal-broiled flavor.

SUMMARY OF THE INVENTION AND OBJECTS

An object of the present invention is to make practicable and economically feasible the treatment of meat products in a continuous process with the result of giving the products a characteristic charcoal-broiled flavor and appearance.

Another object of the invention is to provide a continuous process where a meat product may receive a surface treatment such as searing and branding, generating the charcoal-broiled flavor and appearance, in a time period on the order of about 3 to 5 seconds.

Another object of the invention is to provide apparatus for the surface treatment of food products, such as meat products, by permitting the same to be exposed to an open flame while contacting the products with controlled temperature branding elements.

Another object of the invention is to provide apparatus which will continuously and quickly impart a surface treatment to meat products such as branding and searing without the necessity of turning the product over or of orientating the product during the course of treatment.

Other objects and advantages of the invention will appear from the drawings and description of a preferred embodiment below.

In summary, the invention concerns a continuous method of flavoring and surface treatment of meat products comprising the steps of moving the product along a process path while exposing the product's surfaces directly to an open flame searing treatment, and contacting the upper and lower surfaces of the product with moving, branding elements spaced apart along the path and maintained at a temperature sufficient to impart an imprint on the product which is then removed from contact with the branding elements and the flame.

The apparatus of the invention includes a housing having an inlet and an outlet with inlet and outlet conveyors extending respectively into said housing inlet and outlet. Branding means are arranged in the housing intermediate the ends of the conveyors so that the food product may be transferred from the inlet conveyor to the branding means and thence to the outlet conveyor. The branding means includes a plurality of elongated metal elements spaced at regular intervals a distance that will simulate the appearance on the product of grilled cooking. Open flame heating means are arranged in the housing to impinge flame upon the branding means and the food product thereupon as the food product moves along the process path, and power means serve to drive said conveyors and branding means.

DESCRIPTION OF THE PREFERRED EMBODIMENT

An apparatus 10, which is a preferred embodiment for carrying out the process of the present invention, is shown in the drawings and generally comprises a housing 11 supported by a frame 12.

Figure 1:
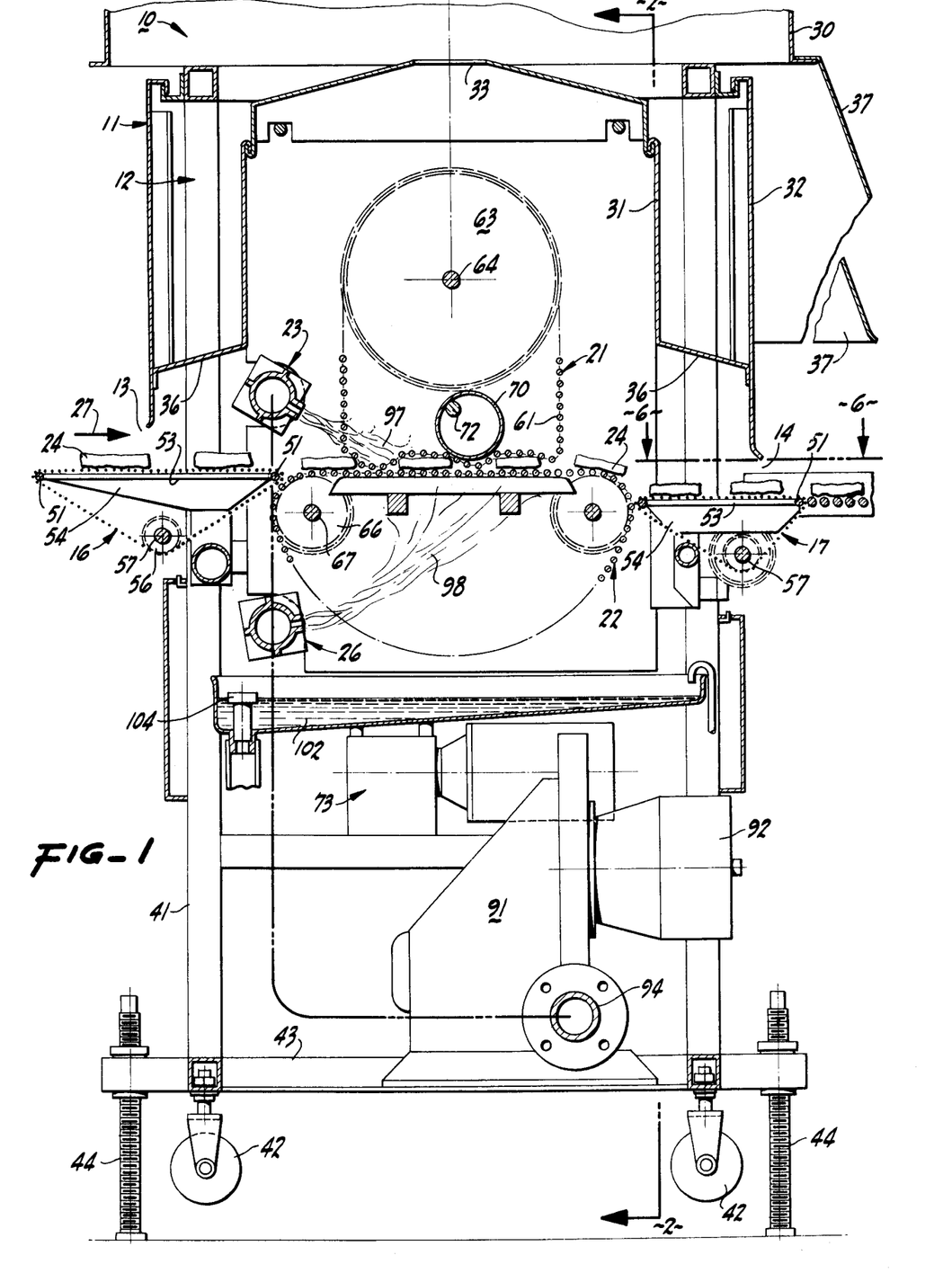
FIG. 1 is a longitudinal view in vertical section of a preferred embodiment of the present invention.

Referring specifically to FIG. 1, the housing 11 is provided with a product inlet 13 and a product outlet 14, a feed or inlet conveyor 16 extending into the inlet and a discharge or outlet conveyor 17 extending from the outlet. Within the housing 11 and intermediate the inward ends of the conveyors 16, 17, there is disposed an upper, rolling, branding grille 21 and a lower, rolling, branding grille 22. An upper flame source 23 is arranged to project a flame upon the product 24 as well as on upper branding grille 21 and a lower flame source 26 is disposed so as to project a flame on the lower branding grille 22 as well as upon the lower surface of the product 24. The direction of product flow is indicated by the arrow 27, FIG. 1, and the general operation of the food treatment unit 10 is to introduce steaks, chops of a meat containing product 24 in patty-like form upon the infeed conveyor 16 to be carried thereby onto the branding units 21 and 22 so that flames from the units 23-26 can impinge upon the product 24 while it is engaged by the heat rodlike elements of the branding units as it is being carried along the process path to be discharged from the branding units onto the discharge conveyor 17. This sequence of operational steps will effect a surface treatment of the product including a searing or sealing action along with a branding of the product with parallel, spaced apart grille marks. This surface treatment imparts the characteristic charcoal-broiled flavor and appearance to the product. Thereafter, the product is finish cooked and such cooking may occur in a unit such as that shown and described in our pending patent application, Ser. No. 328,925, filed Feb. 2, 1973.

Figure 2:
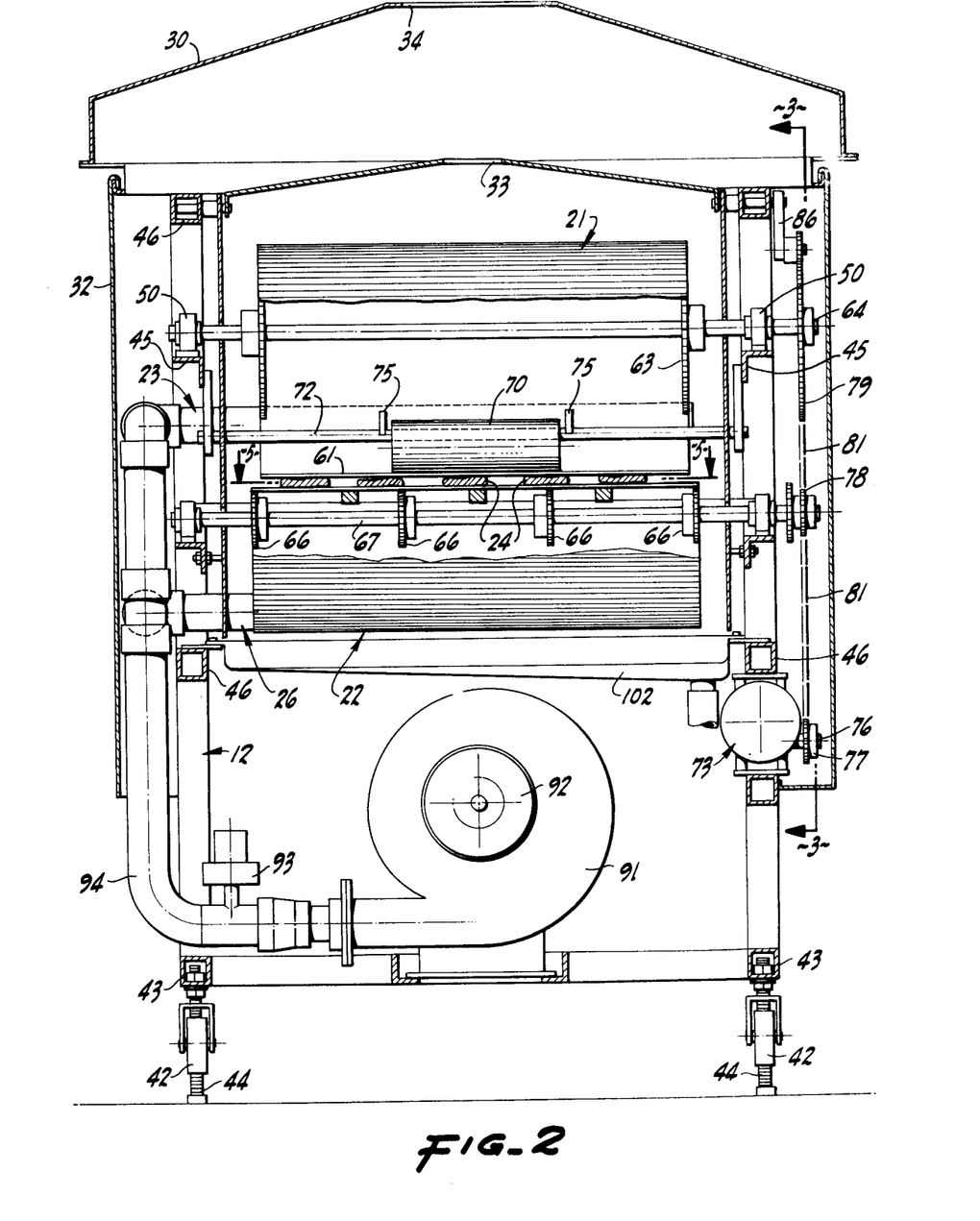
FIG. 2 is a sectional in the direction of the arrows 2—2 of FIG. 1 but in a smaller vertical scale.

Considering now the components of the food treatment unit 10 in greater detail, the housing 11 is of spaced, double wall construction including an inner heat shield 31 and an outer cover 32 arranged as shown in FIGS. 1 and 2. Both the outer cover 32 and inner shield 31 are designed so that portions thereof may be removed to facilitate cleaning and maintenance. An air space is maintained between the inner and outer wall portions of the housing, the air space serving as an insulating barrier for the high temperature atmosphere maintained within the shield 31. At the top, openings 33, 34 are provided in the inner shield and in the outer wall (at a top hood 30) respectively to permit connection of the unit with an exhaust stack (not shown) for exhaust of the vapors created during the treatment process and for maintaining a flow of air for cooling the heat shield 31.

Suitable openings are provided in the inner shield 31 to accommodate the fuel conduits for supplying the burner units 23, 26, as well as for the ends of the drive shafts of the rolling grille units. Baffles 36 are arranged between the inner shield 31 and the outer cover 32 over both the inlet 13 and discharge 14, as shown in FIG. 1. A discharge hood 37 connected to the top hood 30 captures vapors at the discharge 14 for entrainment in the air flowing to the stack.

The frame structure 12 which supports the housing and other components may be fabricated from tubular elements, preferably square in lateral cross section and formed from stainless steel materials so as to minimize the liklihood of contamination of the food products 24, and for ease of cleaning. The frame 12 includes four upright members 41 the lower ends of which are equipped with wheel assemblies 42 affording mobility to the unit 10 for installation purposes. Once the unit is in place, a leveling and jacking system 44 provided on the frame 12 is actuated and includes the horizontal cross members 43 mounted at the lower ends of the uprights 41. The ends of the members 46 are provided with jack assemblies 44 so that the unit 10 may be leveled for operation so that the conveyors 16, 17 may mate with associated equipment in the processing plant. The vertical frame members 41 are tied together into a rigid unit by other cross members 46 arranged as shown in drawings.

Referring to FIGS. 1, 4, 6 and 7, the infeed and discharge conveyors 16, 17 are in certain respects similarly constructed with the reservation that the discharge conveyor alone is provided with a plurality of rollers 47, 48 which permits a gentle transfer of the product 24 from the unit 10 and other processing equipment. Each conveyor assembly 16, 17 includes spaced apart nose bars 51 each provided with a rounded portion so that a flat, flexible wire belt 52 will move smoothly through a change of direction over the bar, from the horizontal to the inclined direction. The abrupt change of direction afforded by the nose bars permits the product 24 to be released from the respective conveyors to an associated conveyor such as the branding grilles 21, 22 or to the transfer rollers 47 positioned at the end of the outfeed conveyor 17. A plurality of supporting bars 53 extends between the end or nose bars 51 and serves to support the wire mesh belt in a substantially horizontal position. Side angles 54 extend between the nose bars 51 and are mounted to the frame 12 through an intermediate frame member 49. A satisfactory belt 52 was found to be one having $\frac{3}{8}$ inch mesh, 0.062 inch diameter stainless steel wire set at 0.286 inch pitch and single loop ends. The conveyor belt is driven by a spaced pair of sprockets 56 on a drive shaft 57 mounted in pillow blocks 55 rigid with the frame and disposed in the driving arrangement shown in FIG. 3 to be described more extensively below.

Figure 6:
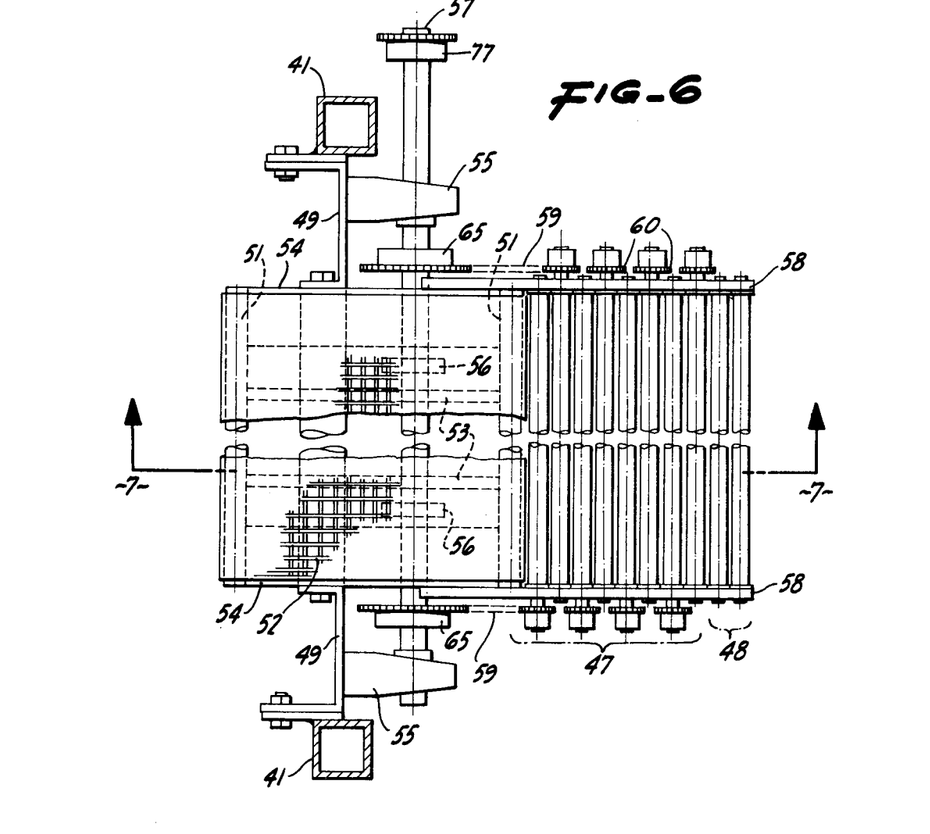
FIG. 6 is a fractured view in the direction of the arrows 6—6 of FIG. 1 showing the discharge conveyor.
Figure 7:
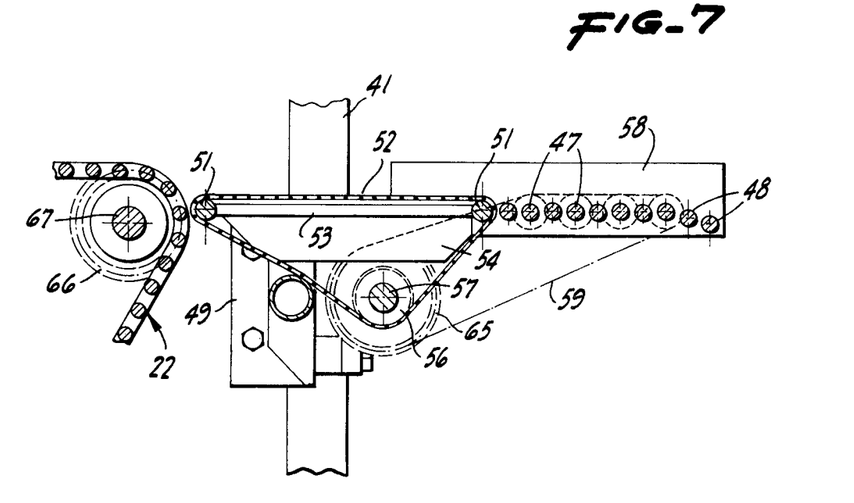
FIG. 7 is a view in the direction of the arrows 7—7 of FIG. 6.

Referring specifically to FIGS. 6 and 7, the transfer rollers 47, 48 are journalled in suitable bearings to the side plates 58 connected to the side angles 54. The series [8 shown] of rollers 47 are driven by a chain 59 and sprocket 60 drive from a sprocket 65 on the discharge conveyor drive shaft 57. The series of transition rollers 48 [2 shown] are not power driven but can rotate freely from functional contact with the product 24. As shown, the plane of the rollers 48 may be inclined downwardly from the general horizontal plane of the discharge conveyor to accommodate the associated processing equipment.

Figure 5:
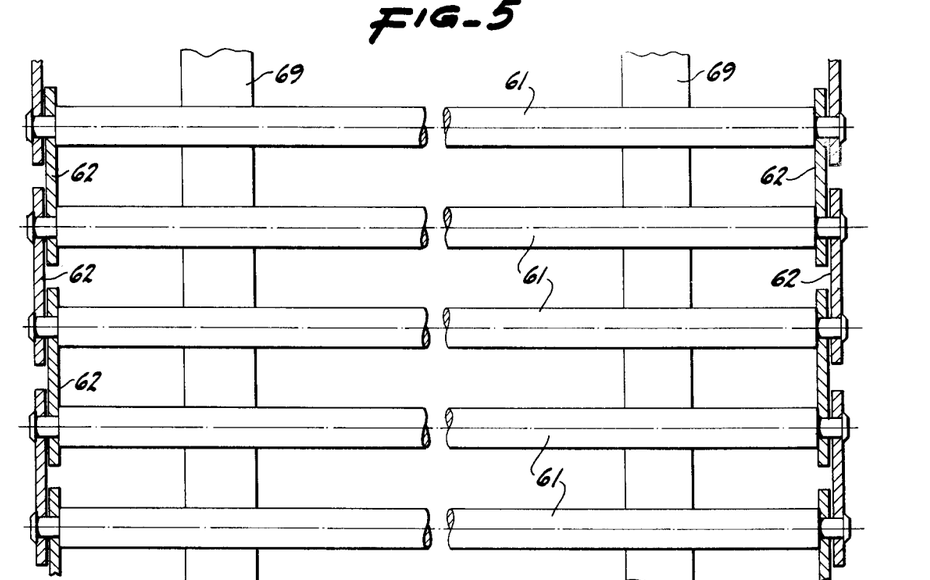
FIG. 5 is a fragmentary plan view of the branding appratus.

The assembly of branding rods and side bars of the upper 21 and lower 22 rolling, branding grilles is shown in FIG. 5 which also includes details pertinent to the lower rolling grille 22. More specifically, each of the grilles 21, 22 includes a plurality of rods 61, each rod having at its ends a portion of reduced diameter for receiving the side bars 62 arranged as shown in FIG. 5. The outer ones of the side bars 61 are fixedly secured to the rod ends as by welding. The inner ones of the side bars 62 are pivotably disposed on the rod ends so that the rolling grilles function similar to a roller chain arrangement. The width of the upper branding grille 21 is narrower than that of the lower grille 22 so that when portions of the two grilles are in contact, as shown in FIG. 1, the respective side bars will not engage each other. From the above, it will be understood that the upper and lower branding grilles comprise continuous conveyor-like belts fabricated as shown in FIG. 5 and described above.

Figure 3:
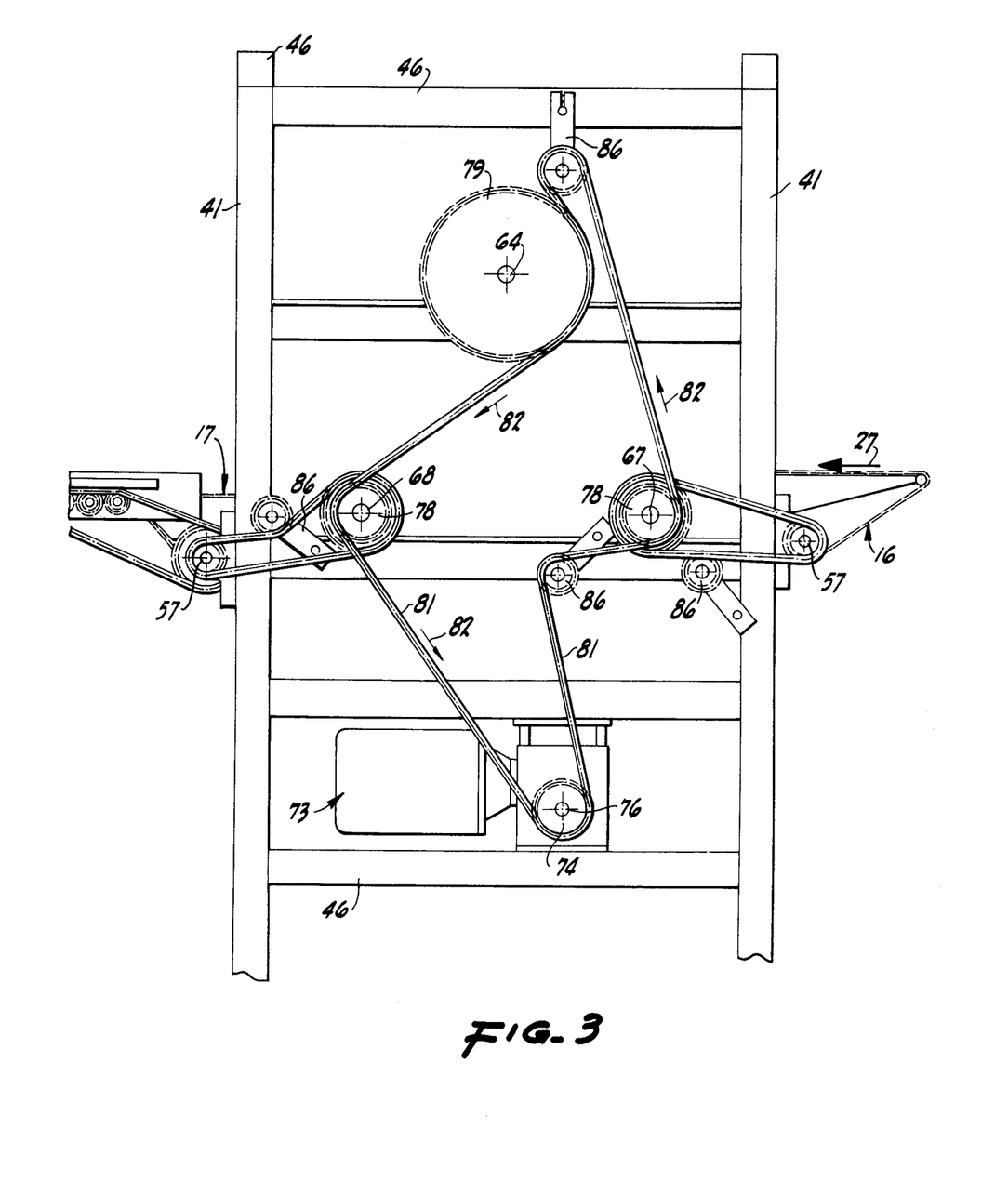
FIG. 3 is a view in the direction of the arrows 3—3 of FIG. 2 showing the drive apparatus of the present invention.
Figure 4:
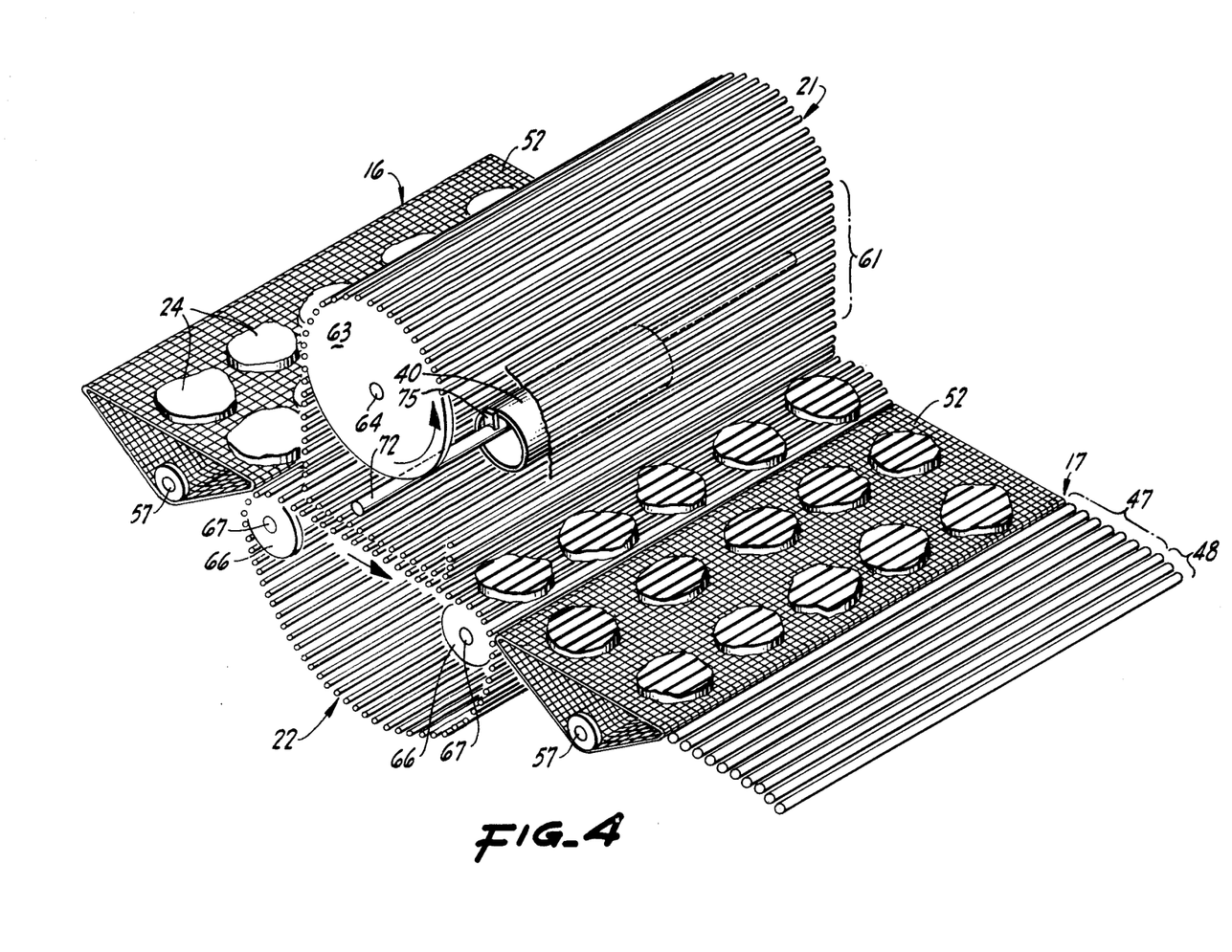
FIG. 4 is an isolated perspective view of the inlet and outlet conveyors and the branding apparatus of the present invention.

Referring to FIGS. 1, 3, and 4, the upper branding grille 21 is reeved in an endless loop over the upper circumference of two spaced apart drive sprockets 63 arranged on a drive shaft 64 which is driven as shown in FIG. 3. The ends of the shaft 64 are journalled in bearing structures 50 supported by the frame cross members 45, FIG. 2. The upper branding grille 21 drapes downwardly in a catenary from the upper circumference of the drive sprocket 63 and the lower run tends to engage and is supported by the upper run of the lower branding grille 22, as shown in FIGS. 1, 2 and 4.

Means 70 for supplying pressure to the middle portion of the lower run insures that the grille rods will maintain contact with the product 24. More specifically, the hold drive or pressure roller 70 extends along a cross bar 72 connected to the frame and is limited by spaced fingers 75 from shifting laterally of the conveyor 21. The roller rests on the rods 61 and its weight holds the rods against the product 24.

The lower branding grille 22 is formed as a continuous belt and is reeved over spaced pairs of drive sprockets 66 arranged on shafts 67, 68, FIGS. 1-4. The shafts 67, 68 are journalled in similar arrangement to the shaft 64 in bearing structures 58 supported upon frame members 59. To maintain the upper run of the lower grille belt against undesirable downward deflection, a support structure is arranged immediately below the rods 61 and consists of three evenly spaced (two being shown), longitudinally extending cast iron support rods 69, FIG. 5, which are supported from the frame and side walls by transverse bars 71, FIG. 1. The lower rolling grille 22 is arranged so that the ends thereof are closely disposed to the adjacent ends of the inlet conveyor and the outlet feed conveyor so that product 21 coming into the branding grilles will be received from the feed conveyor 16 and thereafter released onto the outlet conveyor 17 without adhering to the branding units.

The inlet 16 and outlet 17 conveyors, the upper 21 and lower 22 branding units are all driven by a common drive train from the motor and gear box unit 73, FIG. 3, secured to one of the frame cross members 46. A drive sprocket 74 is arranged on the output shaft 76 of the gear box and one end of each of the two feed and discharge conveyor drive shafts 57 is equipped with a drive sprocket 77, FIG. 6. A drive sprocket 78 is mounted on shafts 67 and 68 of the lower grille and a sprocket 79 is arranged on the shaft 64 of the upper grille unit. A drive chain 81 is reeved from the motor gear box drive sprocket 74 over the sprockets 78 and 79 of the lower and upper grille units respectively and is caused to drive in the direction of the arrows 82 as shown in FIG. 3. Drive sprockets 83 on the shafts 67, 68 are reeved with a chain 84 to power the shaft 67 through the sprockets 77 to drive the inlet and outlet conveyors. Tension and direction reversal units 86 are placed in the drive line as shown in FIG. 3.

From the above, it will be understood that the operation of the motor gear box 73 serves to drive through the components described above the inlet 16 and to discharge 17 conveyors, upper 21 and lower 22 branding grilles in a coordinated manner to the end that product will pass through the unit smoothly and evenly without accumulating any one of the three conveying units.

Figure 8:
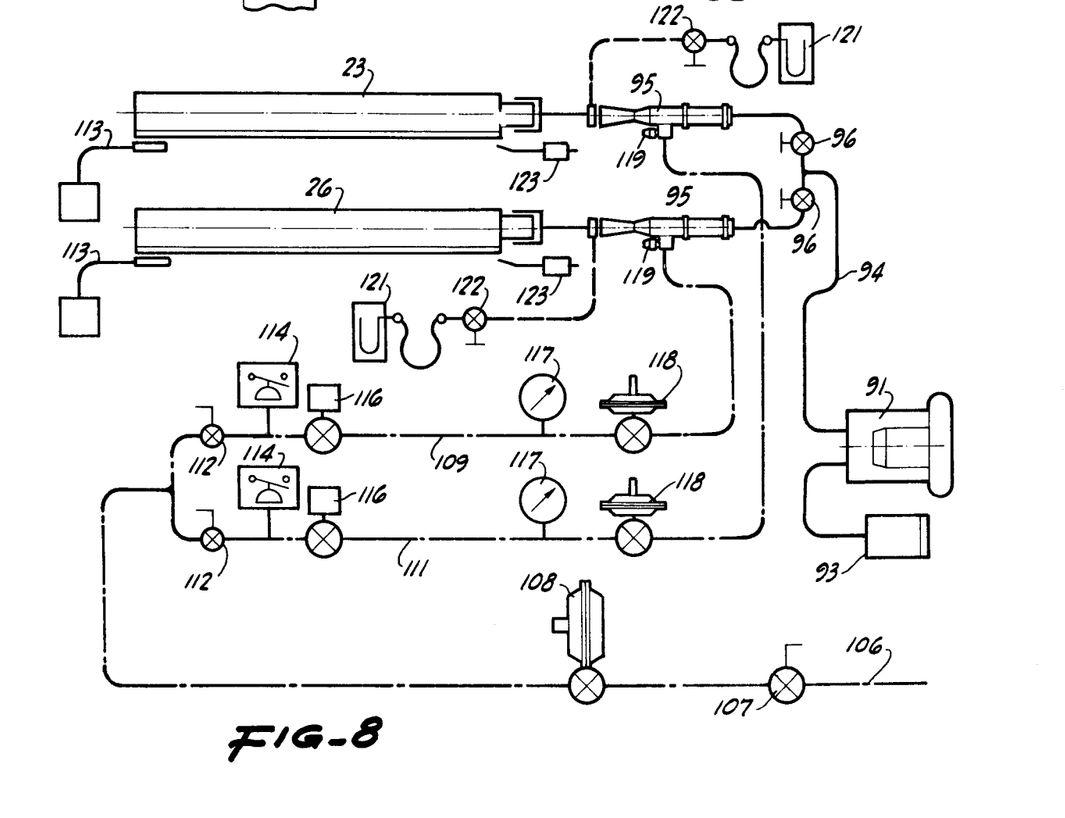
FIG. 8 is a schematic illustration of the gas supply system for the present invention.

The upper 23 and lower 26 flame sources are open flame gas burners arranged in a natural gas and air supply system shown schematically in FIG. 8. The fuel supply system includes a centrifugal air blower 91 powered by an electric motor 92 (FIG. 1) having an associated air filter 93 so as to provide a filtered air supply to an air delivery conduit 94 which tee's into two air/gas mixers 95 through a pair of manually actuated, air regulating valves 96.

A supply of natural gas at a pressure of about one pound per square inch at a rate of about 350 cubic feet per hour can be received by the gas supply line 106 which is equipped with a manual shut-off valve 107 and a flow regulator 108. The gas supply line 106 tee's into two branch supply lines 109, 111 for delivering gas respectively to the mixers 95 for the upper flame source 23 and the lower flame source 36. Each branch delivery line 109, 111 is equipped with a manual shut-off valve 112 enabling the operation of both burning units 23, 26 simultaneously or only one unit at a time depending on the requirements for heat and temperature during the treatment process.

As a safety provision, a flame sensor 113 is associated with each of the burners 23, 26 and electrically coupled to a safety switch 114 which in turn is coupled to a safety control valve 116 arranged in each of the branch lines 109, 111. The flame sensor control system serves to perceive the presence or absence of flames in the burner units, and should flames be absent, to cause the appropriate control valve 116 to close off the supply of gas in the particular branch gas line involved.

Each of the branch lines 109, 111 is equipped with a pressure gage 117 and gas regulator 118 and each line is connected to one of the air/gas mixers 95 which is equipped with a manual gas regulator 119. A manometer 121 is arranged downstream of each air/gas mixer 95 for sensing the air/gas delivery rate to the burning units 23, 26 and each manometer line is fitted with a needle shut-off valve 122, as shown in FIG. 8.

From the foregoing it will be clear that the quality, projection, intensity and extent of the flames 97, 98 emanating from the burner unit 23, 26 may be controlled to achieve the branding and searing objective through actuation of the appropriate valve 96, 119, 112 as in the system shown in FIG. 8 and described above.

Disposed beneath the lower burning unit 26 is a water pan 101 secured to the frame and equipped for holding a body of water 102 which is circulated from the nozzle 103 to an overflow discharge 104. The water serves to receive drippings from the product and carry such away without the danger of fire within the unit.

OPERATION

The food treatment unit 10 is placed in operation in a sequence where first the branding grilles 21, 22 and the infeed 16 and discharge 17 conveyors are set into operation being driven from the motor drive unit 73. The speed of the motor unit is controlled so that product will be treated within the housing in a time period extending between 3 to 7 seconds. Then, the gas burners 23, 26 are ignited so as to produce a rather long, lazy flame 97 which will extend onto the rods of the branding units 21, 22 as illustrated in FIG. 1. The flame 97 is controlled so that the branding grille rods 161 are brought to a temperature of between 700° and 850° Fahrenheit before product 24 is introduced into the unit. Product 24 in a chilled condition, as having been removed from a refrigerator and being at a temperature of about 30 to 45 degrees F., is placed in rows upon the infeed conveyor 16 to be carried through the inlet 13 of the housing 11 in the direction of the arrow 27 towards the lower branding unit 22. These products may be steaks, chops, or hamburger patties. As the product is carried by the infeed conveyor towards the inwardly disposed nose piece 51, the conveyor belt 52 undergoes a sharp change of direction as it traverses the nose piece 51 and the product 24 is released from the conveyor belt 52 by this action and is deposited onto the lower branding unit 22 arranged closely adjacent to the inner end of the infeed conveyor. The product when received upon the lower branding unit 22 is branded on its bottom surface immediately by the high temperature branding rods which are carried at a temperature of between 700°–850° Fahrenheit. As the product is carried by the lower branding unit 22 towards the outfeed conveyor, the product is engaged and branded on its top surface by the high temperature rods of the upper branding grille 21 which drape over the product as shown in FIG. 1 of the drawings. The hold down roller 70 insures that product in the central portion of the belt is branded on the top to substantially the same extent as product on the sides of the belt. Simultaneously, the product is engaged from above and below by the two lazy flames 97, 98 (should the choice be made to use both burner units together, and not one burner solely) and the surfaces of the product 24 are seared by the action of the flames upon them. It has been found that the searing action as well as the branding action imparts the characteristic appearance and flavor of a charcoal-broiled product to the product 24. As the product traverses the lower branding unit 22, it is first released from contact with the rods of the upper branding unit 21 and is then carried along the process path to the outfeed conveyor 17, the upper run of which is positioned a small distance below the level of the top run of the lower branding grille 22. The product traverses the belt 52 of the discharge conveyor 52 at the same speed as it was carried by the branding conveyor 22 and infeed conveyor 16. However, the transfer rollers 47, 48 permit the product 24 to "skid" along their surfaces and thus to decelerate and to accumulate on the transfer rollers without damage, before transfer to the next processing apparatus for further treatment of the product. Thus, the product 24 is received by the discharge conveyor 17 from the lower branding unit. The product 24 is then carried out of the housing 11 through the outlet 14. The product may then be discharged from the outfeed conveyor 17 onto other equipment (not shown) for further cooking treatment.

We claim:

1. Apparatus for imparting surface treatment such as searing and branding to a food product comprising a frame, a housing on said frame and having an inlet and an outlet serving to permit the receiving and discharging of the product with respect to said housing; horizontally spaced apart, inlet and outlet conveyor means extending respectively into said housing inlet and outlet, branding means movably arranged in said housing between said spaced apart inlet and outlet conveyor means to receive the product discharged from said inlet conveyor means and serving to convey the product horizontally within the housing for treatment and to discharge the product upon said outlet conveyor means, said branding means remaining at all times within said housing and including a first branding mechanism serving to mark the top side portion of the product, and a second branding mechanism serving to mark the bottom or underside portion of the product and to support the product and move the same from said inlet to said outlet conveyor means, each said branding mechanisms comprising an endless belt structure formed of spaced apart parallel, interlinked rod-like branding elements, first and second drive means serving to drive in synchronism said first and second branding mechanisms respectively, the drive means for said first branding mechanism serving to support the top run of the endless belt structure for the first branding mechanism and permitting the bottom run of said belt structure to drape downwardly for engagement with the top surface of the product a flame heating means in said housing to cause flame to impinge upon such food product and upon said rod-like branding elements as the food product is moved by the branding means from said inlet to said outlet conveyor means, and power means serving to drive said inlet and outlet conveyor means and said first and second drive means for the branding means.

2. The apparatus defined in claim 1 and including hold-down means engaging the bottom run of the endless belt structure of the first branding mechanism and serving to insure engagement of said rod-like branding elements with the food product.

3. The apparatus of claim 1 wherein said endless belt structure of said first branding mechanism has a length so that its lower run is slack whereby its lower run overlies said meat product for a substantial distance along the path of travel of the meat product through said housing.

4. The apparatus of claim 1 wherein said flame heating means is positioned so that flames therefrom project through the spaces between the spaced apart rod-like elements in the endless conveyor belt structures and serve to heat the same and to sear the product.

5. In apparatus for rapidly imparting meat-searing marks to a meat product prior to final cooking of the same, a housing having inlet and outlet openings, means mounted in said housing for conveying meat products through said housing and having portions thereof extending through said inlet and outlet openings of said housing so that meat products can be placed on and removed from said means exterior of the housing, branding grille means in said housing for conveying the product horizontally within the housing and for placing meat-searing marks on said meat products while in said housing, and means for driving said conveying means and branding grille means, said branding grille means including heat retaining elements operative for repeatedly engaging said meat products in said housing while they are in said housing, said heat retaining elements being positioned in and remaining at all times within said housing and means in said housing for heating said elements to a sufficiently high temperature so that when they engage the meat products the meat products are seared and have formed thereon searing marks corresponding to the configuration of the heat retaining elements, said branding grille means in said housing including an upper endless loop formed from interconnection of a plurality of said heat-retaining elements and means cooperative with said drive means for moving upper portions of said upper loop and moving the heat-retaining elements sequentially into engagement with said meat products, the lower portions of said upper loop having a length to drape downwardly from said last named means to form a catenary, the bottom segment of which rests upon and engages the upper surfaces of the meat products for a substantial distance within the housing, said branding grille means additionally including a lower endless loop formed from interconnection of a plurality of others of said heat-retaining elements, and means cooperative with said drive means for moving upper portions of said lower endless loop and said other heat-retaining elements substantially horizontally in supporting engagement with said meat products, said heat-retaining elements of said upper and lower endless loops engaging upper and lower surfaces of said meat products to rapidly and simultaneously form searing marks thereon while horizontally conveying the same through said housing.

* * * * *